United States Patent [19]

Doss et al.

[11] 4,265,010

[45] May 5, 1981

[54] METHOD AND APPARATUS FOR ADJUSTING THE ELEVATION OF FUEL RODS IN A NUCLEAR REACTOR FUEL ASSEMBLY

[75] Inventors: Glenn D. Doss; Theodore W. Nylund, both of Columbia, S.C.

[73] Assignee: Westinghouse Electric Corp., Pittsburgh, Pa.

[21] Appl. No.: 963,596

[22] Filed: Nov. 24, 1978

[51] Int. Cl.² .................. B22D 19/10; B23P 19/04; B66F 3/18; G21C 19/20
[52] U.S. Cl. .................... 29/402.01; 29/266; 74/413; 81/3 K; 176/30; 176/87; 254/103
[58] Field of Search ............ 176/30, 34, 36 R, 36 C, 176/76, 78, 87; 74/141.5, 142, 413; 254/92, 98, 100, 102, 103; 165/76, 79; 29/434, 400 N, 244, 256, 266, 402.01; 81/3 R, 3 K

[56] References Cited

U.S. PATENT DOCUMENTS

| 158,001 | 12/1874 | Quail | 254/92 |
|---|---|---|---|
| 2,150,831 | 3/1939 | Haney | 254/92 |
| 3,009,313 | 11/1961 | Wheeler | 29/266 |
| 3,665,586 | 5/1972 | Jabsen | 176/78 |
| 4,119,490 | 10/1978 | Delafosse | 176/78 |

Primary Examiner—Donald P. Walsh
Attorney, Agent, or Firm—J. R. Campbell; Z. L. Dermer

[57] ABSTRACT

Method and apparatus for adjusting the level of fuel rods in a fuel assembly which includes a tool having an end insertable between a fuel assembly nozzle plate and the exposed ends of fuel rods. The insertable end of the tool includes stationary and movable plates, the movable plate having a portion which rests on flanges in a forked end of the stationary plate while the other end of said movable plate is bent in a manner such that it lies above the stationary plate. A pair of gears are located in the space defined by the spaced ends of said plates, and screw threaded shafts extend through threaded openings in the movable plate and into gears located in the space between the ends of the plates, so that when one of the shafts is rotated, the force transmitted through said gears causes the other shaft to rotate and the coaction of both threaded shafts thus causes the movable plate to move in a direction away from the stationary plate, and in so doing, cause the fuel rod in contact with the movable plate to be moved in an axial direction and into a position where the end thereof lies in the same plane as the ends of other fuel rods in the assembly.

7 Claims, 4 Drawing Figures

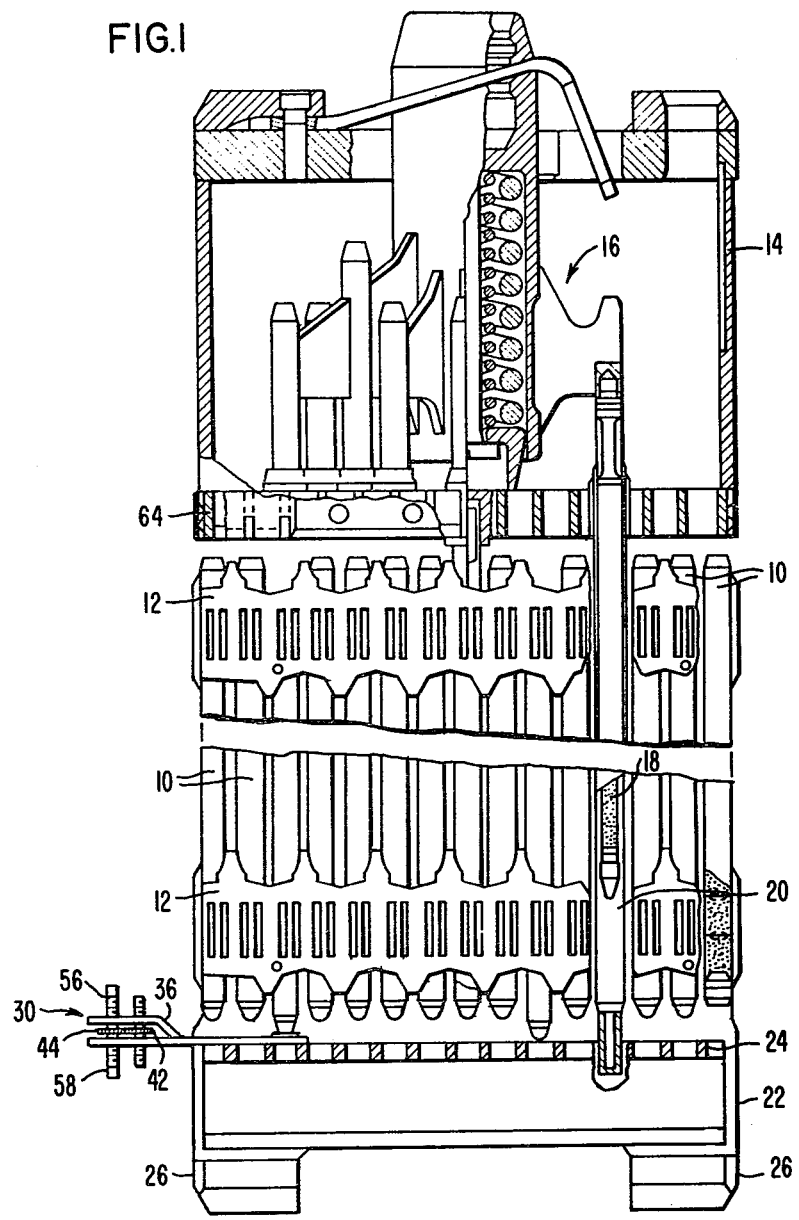

METHOD AND APPARATUS FOR ADJUSTING THE ELEVATION OF FUEL RODS IN A NUCLEAR REACTOR FUEL ASSEMBLY

BACKGROUND OF THE INVENTION

The invention described herein relates to a method and apparatus for axially adjusting the elevation of fuel rods in a nuclear reactor fuel assembly.

A conventional fuel assembly of the type used in commercial nuclear reactors which generate electric power, consists of a multiplicity of fuel rods held in spaced relation with each other by a series of grids spaced along the fuel assembly length. Top and bottom nozzles which lend support and rigidity to the assembly are then attached to the opposite ends thereof to provide a complete fuel assembly ready for reactor use. During the time that fuel rods are being pulled into aligned openings or cells in the spaced grids, springs in each cell force the fuel rod against projections or dimples formed in the wall of each cell. This action results in all fuel rods not being finally positioned in the assembly at the same level, i.e., their ends do not lie in the same plane. Also, this action occasionally causes some of the zircalloy material of the fuel rod to be scraped off on one or both projections. As the fuel rod continues to be pulled into each cell, the zircalloy material rolls into a ball and comes to rest on top of one or both projections. The result of material removal is that the fuel rod loses its center-to-center spacing with respect to other fuel rods to the extent of removal of material. Also, the scraped zircalloy material must be removed to preclude its circulation in the coolant system during reactor operation.

In the past, the fuel rod was moved slightly out of the grid to expose the scraped material and permit its removal manually. The rod was then returned to its original position. To move the fuel rod axially in the grid to not only allow access to the scraped material but also to locate the fuel rod at a precise level in a fuel assembly, a bar was inserted between the fuel rod and a nozzle plate to move the rod in a desired amount and direction. The bar exerted a force on the end of the fuel rod, but these forces were never applied uniformly in an axial direction. Since they were applied at a tangent to the rod axis, distortion of the fuel rod occurred with the result that fuel pellets therein were chipped or cracked and the pellet therefore lost its integral status, which in turn, could cause deviations in reactor performance. It therefore is apparent that the need exists for improved tools and procedures which will allow for adjustment of fuel rods in a fuel assembly to have them all appear at the same level while simultaneously permitting access to scraped material on a fuel rod.

SUMMARY OF THE INVENTION

Briefly stated, the above disadvantages are eliminated by this invention by providing a unique design of tool of a size sufficient to fit in the space between the ends of fuel rods in a fuel assembly and the exposed surface of either a top or bottom end nozzle adapter plate. By exerting only axial forces on a fuel rod which the tool is adapted to engage, fuel rods in the assembly which are improperly positioned or which appear at an improper level, can be moved axially in the assembly without disassembling either the top or bottom nozzles. Although these adjustments accommodate fuel rod level changes in amounts less than a few thousands of an inch, the fuel rods nevertheless can be moved a greater amount to remove zircalloy material built up on good dimples, and then returning the moved fuel rods to a correct position in the fuel assembly.

BRIEF DESCRIPTION OF THE DRAWINGS

The subject matter of the invention is particularly pointed out and distinctly claimed in the concluding portion of this specification. This invention, however, both as to organization and method of operation, together with further objects and advantages, may best be understood by reference to the following description taken in connection with the accompanying drawing, wherein:

FIG. 1 is a view in elevation, partly in section, showing the design of a nuclear reactor fuel assembly having the tool of this invention set in position for adjusting a fuel rod in a vertical upward direction;

DESCRIPTION OF THE PREFERRED EMBODIMENTS

Figure 4:
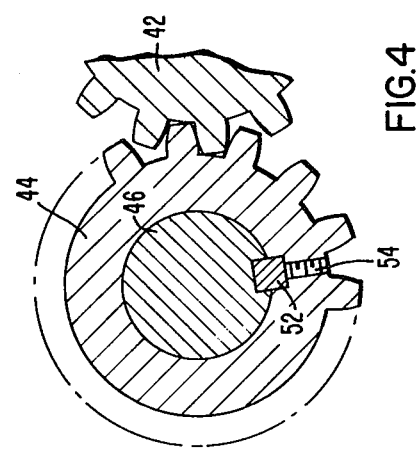
FIG. 4 is a sectional view taken on lines IV—IV of FIG. 2.

Referring now to the drawings wherein like reference characters designate like or corresponding parts throughout the several views, there is shown in FIG. 1 a fuel assembly of the type used in commercial nuclear power reactors. The fuel assembly consists of a multiplicity of fuel rods 10 assembled in a square array and held in spaced relationship with each other by multiple grids 12 which are spaced along the fuel assembly length. FIG. 1 shows that the fuel assembly illustrated in this Figure is broken along its length to provide a larger view for illustrating the invention. A top nozzle 14 surmounts the fuel rods and includes an adapter plate 15 and a mechanism 16 designed to hold a cluster of control rods 18 which operate vertically in control rod guide thimbles 20. The control rods are used for controlling reactivity of the reactor in a well known manner.

The bottom nozzle 22 includes a base which supports an adapter plate 24 and nozzle feet 26. The plate contains openings 27 which permit the flow of coolant upwardly through the fuel assembly during reactor operation.

The fuel rod gap adjusting tool 30 used for adjusting the position of fuel rods 10 vertically in the assembly, is shown in position as being arranged to adjust a fuel rod 10 in the upward direction. As shown, it is inserted into the assembly and a base plate 32 of the adjusting tool is placed directly on the top surface of adapter plate 24 and appropriate adjustments, as hereafter described, are made to move the fuel rod 10 in a vertical direction. In the event the fuel rods extend too far upwardly, the tool also is designed to be reversed from the position shown in FIG. 1 so that the tool may engage the upper end of a fuel rod which may extend too high and fall outside the established tolerances for the fuel rods.

Figure 3:
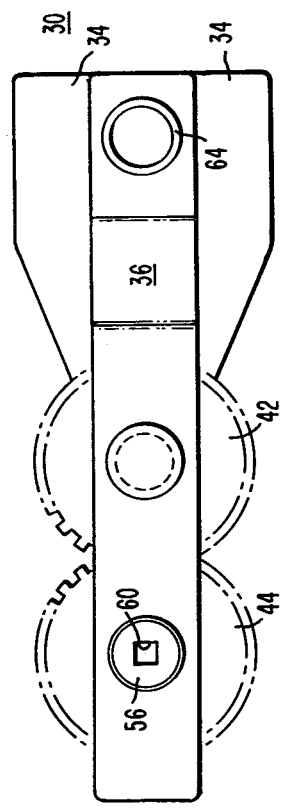
FIG. 3 is a plan view of the tool illustrated in FIG. 2.
Figure 2:
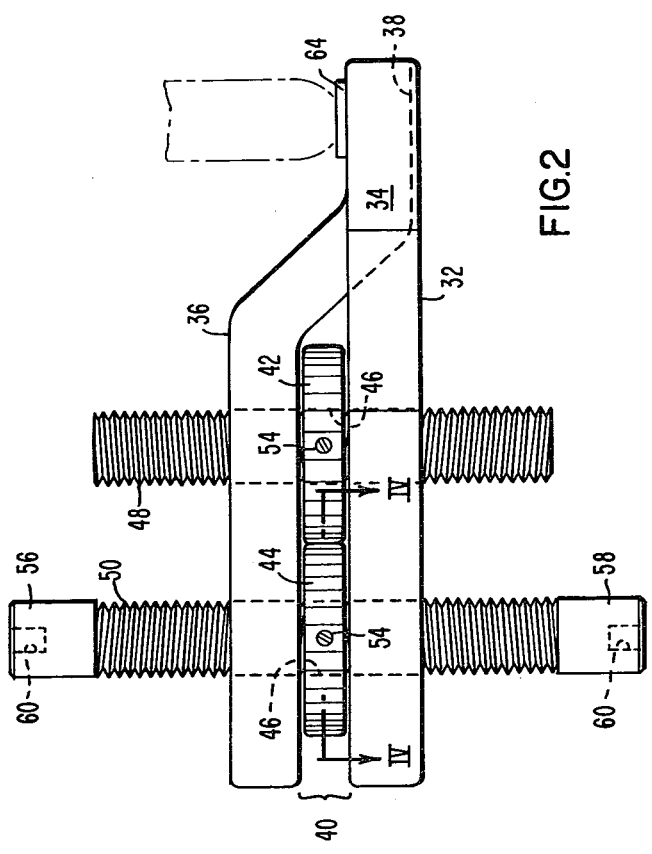
FIG. 2 is a view in elevation, partly in section, of the fuel rod gap adjusting tool used for adjusting fuel rods vertically in the manner illustrated in FIG. 1.

The adjusting tool shown in FIGS. 2, 3 and 4 includes a base plate 32 of substantially square cross section which terminates at one end and a pair of forks 34. As more clearly shown in FIG. 3, the forks 34 are separated a distance sufficient to accept a second plate 36 which has one end adapted to rest on flanges 38 integrally formed on the forks 34. As more clearly shown in FIG. 2, the plate 36 nests in the flanges and is bent at an angle of about 41° to thus provide a space 40 between the facing plate surfaces. A pair of spur gears 42, 44 are located in the interspace area 40 and are positioned to mesh as shown in FIG. 3. Each of the spur gears is equipped with a central opening 46 which respectively receives the threaded shafts 48, 50. To assure direct connection between the shafts and spur gears, a key 52 (FIG. 4) held in place by a set screw 54 serves to lock the threaded shafts and the spur gears together to provide synchronized rotation between the shafts and gears.

Each of the plates 32, 36 are threaded to respectively receive the threaded shafts 48 and 50 on the upper part of the tool, and threaded extensions thereof, 47, 49, on the bottom portion of the tool. Both shafts extend through both plates, but only shaft 50 is equipped with hex nuts 56, 58 on opposite ends of the shaft. Hex type openings 60 are provided in each end of the hex nuts 56, 58, but shaft 48 does not include hex nuts on either end. As clearly shown in FIG. 2, the shaft 48 on the left side of FIG. 2 includes a left hand thread on the upper portion of plate 36 while that part of the shaft extending beneath plate 32 is equipped with a right hand thread. Conversely, shaft 50 includes a right hand thread on the upper end thereof while the lower end includes a left hand thread. With this arrangement, it will be evident that as a wrench is placed in opening 60 and rotated in a clockwise direction, the shaft 50 will rotate, and because plate 36 rests on an immovable surface 24, plate 36 will rise upwardly as the shafts 48, 50 turn in unison.

In operation, to adjust a fuel rod vertically in the fuel assembly, and assuming that the fuel rod must be adjusted upwardly, the tool 30 is placed on the top surface of the adapter plate 24 located in the lower nozzle 22. The lower end of the fuel rod is fitted into a cup-shaped member 62 on the top surface of plate 32. A socket wrench is then inserted in the hex opening 60 formed in the hex nut 56. Rotation of the hex nut 56 in a clockwise direction will impart rotary movement to shaft 50, spur gears 44, 42 and screw shaft 48. The rotary movement of both shafts 48 and 50 will cause the plate 36 to ride upwardly thereon and thus carry with it the fuel rod which is fitted into the opening 62 formed on the end of plate 36. Since the thickness of wall 64 are chosen to fit between adjacent fuel rods, the fuel rod which must be adjusted vertically can therefore be moved up into a position so that its end lies in the same plane as other fuel rods in the assembly. This action may then be repeated for all other fuel rods at an incorrect height.

In the event fuel rods are at too high an elevation with respect to other fuel rods, the adjusting tool 30 is moved to the top of the assembly and placed beneath the top nozzle and the top end of fuel rods 10. The exposed surface of plate 34 is then placed in contact with the lower surface of adapter plate 64 of the top nozzle. As explained above, the upper end of the fuel rod is placed in the opening 62 provided in plate 36 and by appropriately rotating hex nut 58, shaft 50 will be caused to rotate and act through spur gears 44 and 42 to effect rotation of shaft 48. This action will cause plate 36 to move therewith and thus effect lowering of the appropriate fuel rod in the assembly.

Although plates 32, 36 of the adjusting tool are of long, narrow configuration, it will be evident that the plates may take any size and form and have more than one pair of screw-threaded shafts extending therethrough, and still not deviate from the teachings of this invention. A number of shafts and meshing gears may be used. Also, in some installations where the fuel rods are located at a substantial distance from the edge of the assembly and at an incorrect level, it may be desirable to rest plate 32 on an immovable base to handle the reaction forces as plate 36 is moved upwardly. Further, a detent may be located on the end of plate 36, instead of the arrangement 62, 64 shown, particularly if only fuel rods in the outer row are being adjusted.

It will be apparent that many modifications and variations are possible in light of the above teachings. It therefore it to be understood that within the scope of the appendent claims, the invention may be practiced other than as specifically described.

We claim:

1. The method of adjusting the level of a fuel rod in a fuel assembly for a nuclear reactor comprising the steps of:
    locating a gap adjusting tool between a nozzle in the assembly and the end of a fuel rod appearing at an incorrect level;
    placing a surface of the adjusting tool in direct contact with the exposed surface of a nozzle adapter plate;
    placing an end of the adjusting tool over an end of the fuel rod which appears at an incorrect level;
    adjusting the tool in a manner such that the plate thereof which engages the end of the fuel rod moves in a direction to force the fuel rod axially into a position where the end thereof appears at the same level as the ends of other fuel rods in the assembly; and
    removing the tool from said assembly.

2. The method according to claim 1 wherein the step of locating said gap adjusting tool between the nozzle adapter plate and an end of a fuel rod includes locating the adjustable portion of the tool outside said fuel assembly; and
    rotating a device cooperatively coupled with said fuel rod movable plate for imparting force thereto to move the fuel rod in an axial direction.

3. The method according to claim 1 including the step of rotating a threaded shaft extending through the fuel rod movable adjustable plate of the gap adjustable tool, and causing said plate to move in a direction to force the fuel rod in an axial direction; and
    continuing movement of said movable plate until its surface contacts the plugged ends of other fuel rods thus establishing that said fuel rod has been adjusted to the correct level.

4. The method according to claim 3 including the step of rotating said shaft and causing it to rotate gears located between the stationary and movable plates; and
    transferring force through the gears to at least one other threaded shaft extending through said movable plate and thereby causing said screw threaded shafts to move the movable plate uniformly in an axial direction and thereby force a fuel rod axially until its end lies at the same level as the ends of other fuel rods in the assembly.

5. A tool for adjusting the level of fuel rods in a fuel assembly comprising:
    a stationary plate and a movable plate having their ends spaced a predetermined distance;
    at least two gears between said plates;

screw threaded shafts respectively extending through said movable plates and into said gears so that when one of said screw threaded shafts is rotated, forces transmitted through said gears to the second screw threaded shaft causes said plate to be uniformly moved away from said stationary plate.

6. The tool according to claim 5 wherein said stationary plate has a forked end having flanges directed inwardly toward the forks on said plate;

said movable plate having a configuration such that two portions of said movable plate lie in two different planes, one of said planes lying above said gears in order to provide the space between said plates for accommodating said gears; and the other portion of said plate lying on said flanges formed on the forked ends of the stationary plate.

7. The tool according to claim 6 wherein said adjustable tool has a pair of screw threaded shafts which respectively extend through said stationary plate into said gears so that when one of said shafts if rotated, the force transmitted through said gears causes the second shaft to rotate and thereby move the movable plate relative to said stationary plate.

* * * * *